US010462019B2

(12) United States Patent
Wittig et al.

(10) Patent No.: US 10,462,019 B2
(45) Date of Patent: Oct. 29, 2019

(54) PERFORMANCE MONITORING WITH A MOBILE TELECOMMUNICATION DEVICE

(71) Applicant: SAP SE, Walldorf (DE)

(72) Inventors: Frank Wittig, Spiesen-Elversberg (DE); Tobias Hoppe-Boeken, Wiesbaden (DE); Andreas Scherer, Altenkirchen (DE); Christopher Fastabend, Neustadt (DE)

(73) Assignee: SAP SE, Walldorf (DE)

( * ) Notice: Subject to any disclaimer, the term of this patent is extended or adjusted under 35 U.S.C. 154(b) by 324 days.

(21) Appl. No.: 15/333,460

(22) Filed: Oct. 25, 2016

(65) Prior Publication Data
US 2017/0126511 A1    May 4, 2017

(30) Foreign Application Priority Data

Oct. 30, 2015 (EP) .................................... 15192388

(51) Int. Cl.
H04L 12/24    (2006.01)
G06F 16/22    (2019.01)
(Continued)

(52) U.S. Cl.
CPC .............. H04L 41/22 (2013.01); G06F 16/22 (2019.01); G06F 16/2455 (2019.01);
(Continued)

(58) Field of Classification Search
CPC ....... H04L 43/04; H04L 43/045; H04L 43/06; H04L 43/062; H04L 43/067; H04L 43/08;
(Continued)

(56) References Cited

U.S. PATENT DOCUMENTS 8,099,316 B2* 1/2012 Moukas ............. G06Q 30/0242
705/7.29
8,700,462 B2* 4/2014 Collins .................. G06Q 30/02
705/14.41
(Continued)

OTHER PUBLICATIONS

Felcey, "Pushing real-time data changes from an Oracle database to Coherence", Oracle, <https://blogs.oracle.com/felcey/pushing-real-time-data-changes-from-an-oracle-database-into-coherence>, published Jun. 17, 2009, accessed Oct. 24, 2018.*
(Continued)

Primary Examiner — Vivek Srivastava
Assistant Examiner — William C McBeth
(74) Attorney, Agent, or Firm — Harness, Dickey & Pierce, P.L.C.

(57) ABSTRACT

The present disclosure relates to a telecommunication method for monitoring with a mobile end user telecommunication device a telecommunication process on a digital telecommunication system using a telecommunication process monitoring server. The telecommunication process monitoring server is connectable with the mobile end user telecommunication device via a mobile wireless cellular digital telecommunication network. The telecommunication process monitoring server further is connectable with a real-time database. The digital telecommunication system further comprising a plurality of second telecommunication devices being connectable with the telecommunication control server via one or more second digital telecommunication networks. The telecommunication process comprises sending one or more telecommunication messages to the plurality of second telecommunication devices. The real-time database is configured for receiving and storing a plurality of telecommunication status reports about the status of the processing of the one or more telecommunication messages by the telecommunication system.

20 Claims, 9 Drawing Sheets

(51) Int. Cl.
  *G06F 16/2455* (2019.01)
  *H04L 12/26* (2006.01)
  *H04L 29/08* (2006.01)
  *G06Q 30/02* (2012.01)

(52) U.S. Cl.
  CPC ....... *G06Q 30/0246* (2013.01); *H04L 43/045* (2013.01); *H04L 43/067* (2013.01); *H04L 43/08* (2013.01); *H04L 43/16* (2013.01); *H04L 67/1095* (2013.01); *G06Q 30/0201* (2013.01); *G06Q 30/0241* (2013.01); *G06Q 30/0242* (2013.01)

(58) Field of Classification Search
  CPC ......... H04L 43/16; H04L 41/12; G06Q 30/02; G06Q 30/0201; G06Q 30/0241; G06Q 30/0242; G06Q 30/0246; G06Q 10/0631; G06Q 10/109; G06Q 10/1093
  See application file for complete search history.

(56) References Cited

U.S. PATENT DOCUMENTS

| | | |
|---|---|---|
| 8,782,166 B1 | 7/2014 | Deshpande et al. |
| 9,159,095 B1 | 10/2015 | Smith |
| 2002/0120765 A1* | 8/2002 | Boehmke ................ H04L 67/10 709/231 |
| 2007/0192189 A1* | 8/2007 | Popowich .............. G06Q 30/02 705/14.49 |
| 2007/0288298 A1* | 12/2007 | Gutierrez ........... G06Q 30/0201 705/7.29 |
| 2009/0319320 A1* | 12/2009 | Daughtrey ....... G06Q 10/06393 705/7.18 |
| 2012/0231770 A1* | 9/2012 | Clarke .................... H04L 51/34 455/414.1 |
| 2014/0067548 A1* | 3/2014 | Liang ..................... G06Q 10/10 705/14.68 |
| 2014/0075390 A1* | 3/2014 | Gauthier ............ G06Q 10/0631 715/840 |
| 2015/0100412 A1* | 4/2015 | Sterns ................ G06Q 30/0242 705/14.41 |
| 2015/0106193 A1* | 4/2015 | Muller ............... G06Q 30/0246 705/14.45 |
| 2015/0199712 A1 | 7/2015 | Radziwonczyk-Syta et al. |
| 2016/0249084 A1* | 8/2016 | Kates ................. H04N 21/2547 |
| 2017/0083938 A1* | 3/2017 | Laufenberg ........ G06Q 30/0249 |
| 2017/0178182 A1* | 6/2017 | Kuskey .............. G06Q 30/0246 |

OTHER PUBLICATIONS

Lindstrom, "Real Time Database Systems," Solid, an IBM Company, Mar. 25, 2008.*
Locke, "Real-Time Databases: Real-World Requirements", In Real-Time Database Systems, 1997, pp. 83-91.*
European Office Action dated Aug. 24, 2018 for corresponding European application 15 192 388.5-1218.

* cited by examiner

PERFORMANCE MONITORING WITH A MOBILE TELECOMMUNICATION DEVICE

FIELD OF THE INVENTION

The present invention relates to a method for performance monitoring with a mobile telecommunication device and more particularly to a method for monitoring telecommunication processes on a digital telecommunication system with a handheld battery-powered mobile end user telecommunication device. The present invention further relates to a computer program product, telecommunication process monitoring server as well as telecommunication system for performing the respective method.

BACKGROUND

In modern business life computer systems have gained strategic importance and a great significance for supporting, performing, monitoring and controlling a vast variety of activities. In particular for telecommunication computer-based systems are a basic foundation for the communication, interaction, and organization between entities and members of complex organization structures, in particular of decentralized ones.

In a highly mobilized working environment, e.g. requiring frequent travelling on the one hand and continuous availability mostly independent of place and time on the other hand, it may be challenging to efficiently monitor and control telecommunication processes on digital telecommunication systems.

SUMMARY

The present invention addresses a method and system providing for an efficient monitoring of telecommunication processes on a digital telecommunication system. Various embodiments provide a method for monitoring a telecommunication process on a digital telecommunication system, a computer program product, a telecommunication process monitoring server and a telecommunication system for performing the respective method as described by the subject matter of the independent claims. Advantageous embodiments are described in the independent claims.

In one aspect, the invention relates to a method for monitoring with a handheld battery powered mobile end user telecommunication device a telecommunication process on a digital telecommunication system using a telecommunication process monitoring server. The telecommunication process monitoring server is connectable with the mobile end user telecommunication device via a mobile wireless cellular digital telecommunication network. The telecommunication process monitoring server further is connectable with a real-time database. The mobile end user telecommunication device comprises a processor, a display device and a memory. The mobile end user telecommunication device executes a mobile application. The mobile application comprises instructions stored in the memory that, when executed on the processor, cause the processor to display on the display device a graphical user interface configured for presenting one or more telecommunication progress indicators providing one or more performance measurements of the telecommunication process. The digital telecommunication system comprises a telecommunication control server configured for controlling the telecommunication process on the digital telecommunication system. The digital telecommunication system further comprises a plurality of second telecommunication devices connectable with the telecommunication control server via one or more second digital telecommunication networks. The telecommunication process comprises sending one or more telecommunication messages to the plurality of second telecommunication devices. The real-time database is configured for receiving and storing a plurality of telecommunication status reports about the status of the processing of the one or more telecommunication messages by the telecommunication system. The method comprises:

receiving by the telecommunication process monitoring server from the real-time database the one or more telecommunication progress indicators calculated by the real-time database, sending the one or more telecommunication progress indicators to be displayed by the graphical user interface on the display device from the telecommunication process monitoring server to the mobile end user telecommunication device.

This method may allow for an efficient monitoring of the respective telecommunication process on the digital telecommunication system. It may in particular provide a real-time monitoring of the progress and impact of the respective telecommunication process based on telecommunication progress indicators providing one or more performance measurements of the telecommunication process and its impact. These indicators may be efficiently calculated at a backend side by the real-time database using a large amount of fine grain data. Using a mobile end user telecommunication device for displaying the indicators may provide a quick overview over the current progress independent of time and place. Thereby, allowing for an immediate response or intervention in case the same may be necessary.

A mobile end user telecommunication device may for example without limitation be a mobile phone, in particular a smartphone, a tablet computer, a personal digital assistant (PDA), an eBook reader, a smartwatch, a head device like smartglasses, or the like.

A digital network may be any kind of digital information network. A network may be such that it can be implemented to work in a telecommunication system, i.e. as a telecommunication network for communication, i.e. information exchange, between two entities of the system. The telecommunication network may be compliant with any one of the following: TCP/IP, Ethernet, ATM, CDMA, GSM, HSCSD, GPRS, WCDMA, EDGE, Bluetooth, UMTS, HSPA+, Teldesic, Iridium, Inmarsat, WLAN, LTE, LTE-Advanced, WiMAX, WiMAX-Advanced, and i-mode.

Thereby, a telecommunication network as used herein is a collection of terminals, links, and processes which connect together so that communication can be made. In other words, it is a data communication network such as, for example, the Internet or an intranet. The digital telecommunication network may be a wireless network, e.g. a mobile communication network also known as cellular network distributed over land areas, call cells, each served by at least one fixed location transceiver, known as a server side or base station. A mobile wireless cellular digital telecommunication network is a telecommunication network that provides services by using a large number of base stations, each covering only a limited area. It may allow a number of mobile telecommunication devices to communicate with each other and with other devices of a telecommunication system anywhere in the network. For example, the cellular network may use the global system for mobile communication (GSM), code division multiple access (CDMA) or other technologies.

For communication between two entities of the telecommunication network a communication link between the respective entities may be implemented as a point-to-point data communication channel over a data network between two computer application programs of the respective entities, such as the mobile end user telecommunication device and the telecommunication process monitoring server or the telecommunication control server and the second telecommunication devices. In an exemplary embodiment the communication link may be established for example using TCP/IP communication protocol and sockets. When the communication has been established, application programs may communicate with each other using for example remote procedure calls. Sending and receiving data by the respective members of the network may for example be performed using a network identification address. The network identification address may comprise for example a HTTP URL, FTP address, etc. A communication link may be a secure data link, e.g. comprising a secure hypertext transfer protocol (HTTP) connection. This may provide a secure way for transmitting data.

An authentication may for example be performed by checking if an ID of the mobile telecommunication device is locally stored at the telecommunication process monitoring server as a trusted ID, i.e. the telecommunication process monitoring server may only respond to requests submitted by mobile telecommunication devices having a trusted ID.

An application program, also known as application, refers to a computer program designed to perform a group of coordinated functions, tasks, or activities on a computer device. The mobile application program executed by the mobile end user telecommunication device may for example be a calendar application.

A graphical user interface or user interface as used herein refers to an interface generated by a program for displaying information on a display device with selectable user interface elements. User interface elements as used herein may be understood as a user interface object, or a set of user interface objects, displayed on a display screen of a device. A user interface element may e.g. comprise a button, a text box, a tab, an icon, a text field, a pane, a check-box item, a menu bar, a title bar, an action bar or item group or the like. A user interface element may likewise be an image, a display of a numeric character and a combination thereof.

A database as used herein is a collection of electronic information, i.e. data, which is organized in memory or on a non-volatile storage volume in the form of a particular, defined data structure which supports or is optimized for data retrieval by a particular type of database query.

A database may be organized in tables or columns or other forms of data structures to provide efficient retrieval. An individual table may act as database. In conventional databases, all tables of the database have the same structure in respect to the physical organization of the data in the memory or on a non-volatile storage medium. For example, some row-oriented databases may comprise multiple tables which organize their data in a row-oriented manner. Some column-oriented databases may solely comprise tables which organize their data in a column-oriented manner. In said cases, the database and all its tables may structurally be optimized for a particular type of database query. According to some embodiments, the database is a relational database, in particular a column-oriented database or a row-oriented database.

A database as used herein encompasses a data file or repository which contains data that may be accessed by a processor. Examples of databases are, but are not limited to, a data file, relational database, a file system for containing data files and a spreadsheet file. A database may be controlled by a database management system (DBMS). A database management system as used herein is a designed software and/or hardware based system application that is specifically designed to allow the definition, creation, querying, updating and administration of one or more databases. Typically, a DBMS is operable to interact with a user, with other applications, and one or more databases managed by the DBMS to process some requests and to analyze data. A DBMS may allow the definition, creation, querying, update, and administration of databases. Well-known DBMSs include MySQL, MariaDB, PostgreSQL, SQLite, Microsoft SQL Server, Microsoft Access, Oracle, SAP HANA, dBASE, FoxPro, IBM DB2, and others.

The database may in particular be an in-memory database. An in-memory database as used herein is a database managed by an in-memory database management system. An in-memory DBMS primarily relies on main memory for storing the data contained in the memory database. It is contrasted with database management systems that employ a disk storage mechanism. Typically, main memory databases are faster than disk optimized databases, since the internal optimization algorithms are simpler and execute fewer CPU instructions. Accessing data in memory eliminates seek time, when querying the database, which provides faster and more predictable performance than storage disks.

An in-memory DBMS may store data on volatile memory devices. These devices lose all stored information, when the device loses power or is reset. In this case, the memory DBMS can be said to lack support for the durability portion of the ACID (atomicity, consistency, isolation, durability) properties. Volatile memory based in-memory DBMS may, and often do, support the other three ACID properties of atomicity, consistency and isolation. However, an in-memory DBMS may allow persisting the stored data by means of snapshot files, checkpoint images, or other mechanisms which record the state of the database at a given moment in time on a non-volatile storage. The in-memory DBMS may generate these records periodically or when it does a controlled shut-down. Examples for an in-memory DBMS are SAP's HANA or Microsoft's SQL CE.

A real-time database as used herein refers to a database which is configured to use real-time processing to handle workload with constantly changing states. In contrary, traditional databases in general contain persistent data which is mostly unaffected by time. A real-time database may deploy timing constraints that represent a certain range of values for which the data are valid. This range is called temporal validity. An effective real-time database needs to be able to handle time-sensitive queries, return only temporally valid data, and support priority scheduling. To enter data into the database, a sensor or an input device may monitor the state of a physical or virtual system of which data is acquired and update the real-time database with new information to reflect the physical or virtual system accurately. A real-time database may be required to restrict transaction operations to one transaction operate at a time to preserve data consistency, since data transaction may comprise read and scan operations.

Real-time databases may improve accuracy as well as efficiency and avoid conflict by providing deadlines and wait periods to insure temporal consistency. In order to do so, a real-time database may process transaction operations utilizing scheduling algorithms for concurrency control. A real-time database may form deadlines based on timestamps and/or values identifying the importance of a particular transaction assigned to each transaction to schedule transaction. Scheduling algorithms may be based on different definitions of priority like the following examples: earliest deadline PT=DT, where PT refers to the priority of a transaction and DT to the deadline of the transaction based on its timestamp, i.e. any value beside the deadline is negligible; highest value PT=1 NT, where VT is a value assigned to the transaction, i.e. the deadline of the transaction is negligible; value inflated deadline PT=DT/VT, wherein equal weight may be given to the deadlines and values based on scheduling. A real-time database may use mechanism of absolute and relative constraints for the data to ensure accuracy of the stored data. A real-time database may further be using a weight policy method, wherein the policy avoids conflicts by asking all non-requesting blocks to wait until the most central block of data is processed. The type of response to a missed deadline may depend on whether the deadline is hard, firm, or soft one.

Database mirroring as used herein refers to the creation and maintenance of one or more redundant copies of a database or parts of a database. Database mirroring may be used to ensure continuous data availability minimizing or avoiding downtime from data corruption or loss, or from a situation when the operation of a network is partially compromised. The resultant redundancy may ensure that at least one viable copy of a database remains accessible even during e.g. system upgrades. In case of database mirroring at least two copies of a single database or a part of a database reside on two different computer systems, also referred to as server instances, which may be located at locations physically separated from each other. The principal server instance may provide the database to client devices, while the mirror instance may act as a standby that can take over in case of problems with the principal server instance. To ensure high accuracy, database mirroring may require that the mirror server instance always stay current, i.e. the mirroring system may immediately copy every change in the principal server instance to the mirror server instance. According to embodiments, the real-time database may comprise one or more data files mirroring one or more data files of one or more second databases.

A database operation as used herein is an event, during which data elements are read on the database, during which data elements of the database are modified, during which data elements are removed from the database, or during which data elements are added to the database.

A selection criterion as used herein is data which can be used in the context of a database management system to identify and retrieve some data stored in the respective database. Thereby, said data selection criterion allows selecting of data to be retrieved, i.e. it acts as a kind of identifier for a data structure comprising information to be retrieved.

A telecommunication progress indicator as used herein refers to any kind of parameter providing a performance measurement describing the progress or status of the telecommunication process itself or the status/progress of a second system, process or entity resulting from the respective telecommunication process, i.e. the influence of the telecommunication process on the second system, process or entity. The telecommunication progress indicators may for example indicate the number/ratio of messages successfully received by second telecommunication devices; the status of technical devices deployed for processing the messages; the number/ratio and type of reactions to the receipt of the messages, like e.g. read confirmations, replies, accesses to one or more links provided or referred to by the messages, requests, orders, confirmations of performed actions requested by the messages, etc. The telecommunication progress indicators may comprise key performance indicators (KPI). A key performance indicator as used herein is any kind of parameter used to present status and/or trend of any kind of entity, in particular organization, companies, departments, machines, persons, and the like related to or participating in the telecommunication process. Each KPI may have assigned a KPI value relating to a particular entity. The KPI may also be used for storing information of a particular entity, e.g. the temperature of a particular device or manufacturing process location which is referred to or enquired by the telecommunication process. In order to evaluate the performance of a particular entity, different sets of KPIs may be used. For example, the status and progress of a marketing campaign may be evaluated using KPIs presenting the amount of money spent for the campaign, number and type of actions performed, like the number of campaign messages sent, campaign follow up data like numbers of confirmed receipts, number of accesses to certain URLs, numbers of downloads of certain data files, numbers of orders placed, numbers of responses received, numbers of calls from recipients etc. Thus, the indicators may allow evaluating the success e.g. of a marketing campaign for which the telecommunication process is to be used, wherein the success may be defined in terms of making progress towards a pre-defined goal.

A link, as used in the context of the present invention, may be any kind of computer-interpretable, directed connection between data objects. A document containing a particular link will be referred to as source document of the link and the document to which the link points to will be referred to as destination document. According to embodiments, a messages send by the telecommunication process may be provided in form of source document. The destination document may for example be a webpage of a website provided via the Internet or via an intranet. A well-known example for a link within a plain-text section of a source document is a hyperlink, e.g. URL hyperlink. A Hyperlink is a reference to a destination document or a text section or piece of meta-information of said destination document the user can directly follow, e.g. by clicking on an icon or a text phrase providing the hyperlink functionality (the hypertext). Hyperlinks that access a destination document from the Internet are called URL hyperlinks. A URL hyperlink in accordance with the present invention may be created as a data object (e.g., a graphics figure or text) comprised by the sent messages.

Status reports as used herein may be any kind of data comprising information about the status of the telecommunication process, the technical devices deployed by the telecommunication process, the status of second systems, processes or entities resulting from the respective telecommunication process. The status report may e.g. comprise transactional data related to the telecommunication process. Transactional data as used herein relates to data that specifies an amount of resources having been added to or having been removed from a physical object at a given moment in time. For example, a transactional data record could specify that a particular machine or a particular number of machines were removed from a production line at a given moment in time or could specify that a particular amount of money was credited to an account. Transactional data may also comprise data that specifies an amount of resources having been transferred from a physical object at a given moment in time to another physical object. For example, the transactional data could specify that a particular machine was moved from one production line to another production line or that an amount of money was transferred from an account of a first person to another account of another person.

A telecommunication process monitoring server as used herein may comprise or be operatively coupled to a real-time database storing data which is relate to the telecommunication process, i.e. which provides information on the respective telecommunication process itself and/or its results. The real-time database may be an integral part of the telecommunication process monitoring server or of an external processing system. The telecommunication control server as used herein refers to a computer system configured for controlling the telecommunication process. According to embodiments, the telecommunication control server may execute the respective telecommunication process by itself, i.e. it may be configured to generate and send messages and to receive replies. According to embodiments, the telecommunication control server may be operatively coupled to and control one or more execution servers, like e.g. email server, which execute the respective telecommunication process. The telecommunication process monitoring server as well as the telecommunication control server may be configured as middleware servers. A middleware server is a server computer system, connected via first network with at least one back end server, e.g. database server or message server, like an email server, and further connected via a second network with at least a terminal computer system like, e.g. a mobile end user telecommunication device. A back end server is a server computer system connected via the first network with a middleware server, wherein the back end server provides data and application functionality. Middleware servers generally act as intermediation entities for data exchange between back end servers and terminal computer systems, like e.g. real-time database and mobile end user telecommunication devices.

Telecommunication messages as used herein are any kind of digital messages like emails, SMS, MMS, instant messages, voice messages, video messages and the like.

The second telecommunication devices may be any kind of computer system configured for receiving telecommunication massages, e.g. mobile end user devices like smartphones, tablet computers, PDAs, eBook readers, smartwatches, head devices like smartglasses etc., as well as server computer systems like email servers etc., or client computer systems like personal computers or laptops etc.

The telecommunication progress indicators, also referred to as indicators, sent to the mobile end user device may be displayed by the graphical user interface on the display device of the end user telecommunication device. This allows for a display of compressed key information about the current status and progress of the telecommunication process. The real-time database provides real-time data, i.e. the data provided by the database is continuously kept up to date. The indicators are calculated by the real-time database. This may have the beneficial effect that the database provides sufficient computation power and resources to efficiently handle large amounts of data. The database may calculate the indicators upon request or upon changes of the data used for the calculation. Thus, the indicators may not be preventively calculated and stored in the database. The indicators are rather only calculated upon a triggering event, like a request or data change. The calculation may be performed on the fly, i.e. without storing the indicator. Upon calculation, the resulting indicators are sent to the mobile end user device for displaying. Thus, it may be ensured that indicators displayed on the mobile end user device always provide up-to-date information about the current state and progress of the telecommunication progress and/or its results.

According to embodiments, the telecommunication status reports may comprise a set of data regarding the status and progress of the telecommunication progress and its results, like e.g. on the sending status of the messages; notices of receipt of the messages; auto responses like e.g. out of office notes; responses regarding the content of the massages; reactions to the messages like activation of links provided by the messages, downloads performed, URLs accessed, orders placed; status of the technical devices used for sending and receiving the messages.

Using these data received and stored by the real-time database, the indicators are calculated and provided to the end user device. Even highly complicated calculations of indicators may be handled efficiently by the database.

The data stored in the real-time database which is used for the calculation of the indicators may be fine grained data rather than aggregated data. This may have benefits in flexibility of data processing by treating each grain of data in isolation if required. Thus, definition of the indicators may be modified whiteout requiring modifications of the database structure providing a high flexibility in defining and optimizing indicators to be calculated by the real-time database. Furthermore, the indicators may be defined to provide a performance measurement reflecting even highly specific characteristics of the telecommunication process and its results. The usage of fine grained data, on the one hand, may provide a precise overview on complex data and, on the other hand, the respective data used for the calculation may not be pre-processed, i.e. aggregated, but the indicators may rather be computed on the data as received by the database. Thus, computational costs for pre-processing may be avoided.

According to embodiments, the database is an in-memory database. An in-memory database may have the advantage that it is faster compared to a traditional e.g. disk-based database, since datasets comprised by the database are stored in the memory allowing a fast access to requested data. Accessing data in memory may eliminate seek time when querying the data and internal optimization algorithms may be simpler and execute fewer CPU instructions.

According to embodiments, the telecommunication process monitoring server may initiate the telecommunication process using the telecommunication control server by sending a set of initiation parameters to the control server. These initiation parameters may comprise specification on the type of messages to be sent, on the telecommunication devices used for sending the messages, on the content of the messages, on the intended recipients of the message, etc.

According to embodiments, pre-defined measures may be taken automatically depending on the values of the indicators. Messages may for example be resent in case an indicator indicates that a certain number of messages has not been received. Messages may for example be sent to a larger group of recipients in case the process used previously for sending messages was successful. The type, content and/or transfer channels of the messages may for example be amended in case of leaking success.

According to embodiments, the method further comprises: the receipt of the one or more telecommunication progress indicators by the telecommunication process monitoring server is initiated by the telecommunication process monitoring server querying the real-time database for the respective one or more telecommunication progress indicators.

This may have the beneficial effect that the indicators are calculated by the database on the fly triggered by the request of the telecommunication process monitoring server, thus reflecting the latest information about the status and progress of the telecommunication process available in the respective database.

According to embodiments, the method further comprising: the query of the real-time database for the one or more telecommunication progress indicators is initiated by the telecommunication process monitoring server in response to receiving a request for the one or more telecommunication progress indicators from the mobile end user telecommunication device.

This may have the beneficial effect that indicators are calculated on request by the telecommunication device, when the respective indicators are to be displayed on a display device of the respective telecommunication device. Thus, the indicators are not preventively requested and stored by the telecommunication process monitoring server. The indicators therefore may provide the latest information available, when being displayed.

According to embodiments, the request for the one or more telecommunication progress indicators is received from the mobile end user telecommunication device upon starting the mobile application.

This may have the beneficial effect that the indicators are provided to the telecommunication device and are ready for inspection, when the mobile application for displaying the same is started. The respective mobile application may for example be a calendar application. The telecommunication processes may be assigned to calendar events of the respective calendar application. For example, a marketing campaign using the telecommunication system may be provided by the calendar application as a calendar event corresponding to the time during which the campaign is executed. Upon start of the calendar application indicators may be requested for all calendar events which are assigned to a telecommunication process. This may have the advantage that, when selecting a calendar event, the respective indicators assigned to the selected event may be immediately displayed as part of the display element showing details of the respective calendar event.

According to embodiments, a set of indicators of a set of telecommunication processes may be requested. The database may provide storage for data of a plurality of telecommunication processes. The requested set of indicators may be calculated by the database and sent to the mobile end user telecommunication device using one message comprising the requested set of indicators. This may have the beneficial effect that the efficiency of providing indicators may be increased, since the database is accessed only once and the data overload required for sending messages comprising the indicators is generated only once.

According to embodiments, the request for the one or more telecommunication progress indicators is received from the mobile end user telecommunication device automatically in pre-defined intervals of time.

This may have the beneficial effect that the indicator is continuously updated. Thus, the indicators displayed on the mobile end user device are kept up to date even after the application has been started.

According to embodiments, the request for the one or more telecommunication progress indicators is received from the mobile end user telecommunication device upon selection of a display element to which the respective one or more telecommunication progress indicators are assigned. A display element may for example be assigned to a calendar event of a calendar application. When the respective display element is selected, the assigned calendar event may be displayed comprising the requested indicators.

Calculating the indicators upon selection of the respective display element may allow ensuring that displayed indicators reflect the latest state of information available by the real-time database. Whenever a display element assigned to a telecommunication process is selected, the respective indicators of the selected telecommunication process may be calculated and provided for display to the end user telecommunication device.

According to embodiments, the receipt of the one or more telecommunication progress indicators by the telecommunication process monitoring server is initiated by the real-time database calculating and sending the respective one or more telecommunication progress indicators to the telecommunication process monitoring server upon detecting an amendment of a pre-defined entry of the real-time database.

This may have the beneficial effect that status changes of the telecommunication process and its results may be tracked in real-time. The respective indicators may be provided in the form of push messages, i.e. the request for the calculation and transaction of the indicators is initiated by the real-time database itself. Furthermore, unnecessary recalculations of indicators which have not changed, as it may be the case for updates base on pre-defined intervals of time, may be avoided.

According to embodiments, one or more first sets of indicators assigned to a first set of entries of the real-time database are calculated and provided in the form of one or more push messages upon change of one or more entries of the first set of entries, while one or more second sets of indicators are updated according to pre-defined intervals of time, like e.g. every five or ten minutes.

This may have the beneficial effect that the update of the indicators of the first set of entries may be triggered by a change of one or more prioritized entries of the database, like e.g. entries comprising data which strongly influences the costs of the telecommunication process or the time of completion of the telecommunication process. These prioritized changes may be tracked in real-time, while other indicators, not affected by the changes of the prioritized entries, may be updated according to predefined intervals of time. This may have the advantage to provide a balance between the requirement to track changes with significant implications on the intended success of the process in real-time, while other changes are tracked on a less frequent base and/or on request by the mobile end user telecommunication device, when going to be displayed thereon. This may allow saving computational recourses by reduce the computational load of the real-time database as well as the workload of the telecommunication connection between the real-time database and the mobile end user device via telecommunication monitoring server.

According to embodiments, indicators of the one or more first sets of indicators are calculated and provided in the form of one or more push messages upon a change of one or more entries of the first set of entries, upon determination that the change satisfies one or more predefined criteria. A predefined criterion may for example be different between the previous value of an entry and the changed value of the respective entry. A calculation of the indicators and a generation of a push message may for example be triggered upon determining a relative change exceeding for example 10 percent, 20 percent, 25 percent, 50 percent, 75 percent.

An alternative criterion may be an exceeding of a predefined value of the entry or the identity of the entry with a predefined value.

This may have the beneficial effect that a calculation of the indicators of the first set of indicator is not triggered by any change of a respective entry, but only by significant ones. This may save computational recourses by reduce the computational load of the real-time database as well as the workload of the telecommunication connection between the real-time database and the mobile end user device via telecommunication monitoring server.

According to embodiments, the telecommunication process is one of a set of telecommunication processes executed on the digital telecommunication system, each telecommunication process is monitored by the telecommunication process monitoring server, the one or more telecommunication progress indicators are telecommunication progress indicators of a set of telecommunication progress indicators, wherein for each telecommunication process of the set of telecommunication processes one or more telecommunication progress indicators are received by the telecommunication process monitoring server and sent to the mobile end user telecommunication device.

This may have the beneficial effect that the computational cost and overload required for requesting, calculating, processing and transferring indicators is reduced by bundling the requests and calculation results for the indicators. For example, a plurality of indicators of a plurality of telecommunication processes may be sent in one message to the mobile end user telecommunication device.

According to embodiments, the method further comprises:
  receiving a request for a list of telecommunication processes with telecommunication progress indicators satisfying a pre-defined criterion,
  querying the real-time database for telecommunication processes with telecommunication progress indicators satisfying the pre-defined criterion,
  in response to the query receiving the respective list of telecommunication processes,
  sending the received list to the mobile end user telecommunication device in order to indicate the telecommunication processes comprised by the received list.

This may have the beneficial effect that it allows the telecommunication process monitoring server to determine out of a plurality of telecommunication processes those processes which satisfy one or more common criteria, i.e. have a common characteristic feature. The pre-defined criterion may be given by a pre-defined selection criterion for the real-time database. For example, all processes which are delayed compared to a pre-defined schedule, e.g. one or more expected events have not taken place yet or only at an insufficient rate. A pre-defined criterion may for example be given by a certain ratio between an input of the telecommunication process and a resulting output. The respective ratio may for example be the ratio between the number of sent messages and the number of received responses, or the ratio between the number of sent messages and a number of accesses to one or more URLs, or the ratio between the numbers of sent messages and a number of downloads, or the ratio between the numbers of sent messages and a number of orders placed. This allows the user of the end user telecommunication device to identify problematic or potentially problematic processes even at an early stage of the respective processes, such that he may be able to intervene in time for solving the problem. In addition, processes may be identified which are or have been successful or non-successful. Using a comparison between successful and non-successful processes may allow determining measures for improving less successful processes. Furthermore, pre-defined automated correction measurements may be taken, like e.g. amending destinations of the messages sent, increasing the number of messages sent, changing the distribution channels used for the sending of the messages.

According to embodiments, the method further comprises: the one or more telecommunication progress indicators and their calculation methods are defined by the telecommunication process monitoring server which sends the respective definitions to the real-time database by which the respective definitions are stored for calculating the respective telecommunication progress indicators.

This may have the beneficial effect that the indicators may be defined and customized for one or more processes to be monitored. The definition may be identical or based on a certain pre-defined standard definition or may be generated from scratch. The real-time database receives the definition and stores the same. Whenever indicators are requested, the database may determine and/or access the definitions assigned to the indicator requested by the received query and perform the data extraction and indicator calculation using the respective definitions. Thereby, indicator definitions may be stored and accessed in the form of database entries.

According to embodiments, the indicator definitions may be sent to the database in combination with a query for the respective indicators such that the database may use the received definition to perform the received query. This may have the beneficial effect that definitions of indicators may for example be stored and managed centrally by the telecommunication process monitoring server and used for a plurality of real-time databases. According to embodiments, the definition may be requested by the telecommunication process monitoring server from a third database and transferred to the real-time database upon need.

According to embodiments, the database further is configured to store the plurality of telecommunication status reports without preprocessing the telecommunication status reports for the calculation of the one or more telecommunication progress indicators.

This may have the beneficial effect that fine grained data comprised by the status reports received by the database is stored directly in its fine grained form without aggregation and may thus be immediately available for the calculation of progress indicators. Due to the fine grained structure of the data stored, a high flexibility for defining indicators is provided. The calculation of the indicators may use even the most basic information available allowing for a very fine grained data analysis. Furthermore, the received data may be available on a very short timescale avoiding delays between the events described by the data and the availability of the respective data in the real-time database.

According to embodiments, the real-time database further is configured to comprise one or more data files mirroring one or more data files of one or more second databases.

This may allow for setting up the real-time database based on a mirroring system comprising a plurality of databases. The second databases may be real-time databases as well. This may further have the beneficial effect that the real-time database may use other databases for providing data for the calculation of indicators. The other databases may still be used for other purposes and other procedures in parallel.

According to embodiments, the mobile application is a mobile calendar application displaying the one or more telecommunication progress indicators as part of a calendar event representing the respective telecommunication process.

This may have the beneficial effect that the indicator may be displayed in an intuitive and effective way using the calendar application. The telecommunication process, which may be characterized as an event in time, may be represented by a respective calendar event which is identical to the process or which is related to the process. In particular, the processing capacity required for displaying the indicators may be kept at a low level, e.g. at the level required for updating, integrating and displaying a set numerical values given by the indicators. With all calculations being handled at the back end side of the process, the energy consumption of the battery-powered end user handheld telecommunication device may be kept low resulting in an extending battery run time for the respective device.

According to embodiments, the sending of the one or more telecommunication progress indicators further comprises sending a command for displaying a warning for one or more of the telecommunication progress indicators satisfying a pre-defined criterion.

This may have the beneficial effect that problems or potential problems with the telecommunication processes may be identified and efficiently be brought to the attention of the end user, even at an early stage of the processing.

According to embodiments, the warning is based on a color code, like red indicating a problem, orange indicating a potential problem and green indicating a successful progress of the respective process. According to embodiments, the warning may be presented by a popup message, warning the end user of a problem, even in case the display element assigned to the problematic process, like a calendar event, is currently not displayed. According to embodiments, the popup message may be shown on the lock screen of the end user mobile telecommunication device.

According to embodiments, the pre-defined criterion is an exceeding of a pre-defined threshold value.

This may have the advantage that a warning is issued, when a predefined difference or ratio between a calculated indicator value and an expected value for the respective indicator is exceeded. The calculated indicator may for example be given by the total number of responses received, the total number of offers received, the total number of downloads requested, the total costs induced by the process. Furthermore, a warning may be issued, when a predefined difference or ratio between a first and a second indicator is exceeded, for example the ratio between the number of responses received and the number of messages sent, or the ratio between of the number of responses received and the orders placed, etc.

According to embodiments, one of the pre-defined criterion is a non-exceeding of a pre-defined threshold value.

This may have the beneficial effect that a warning may be issued upon determination that a pre-defined criterion, e.g. a pre-defined intermediate result, has not been reached, like less responses, URL accesses, downloads or orders than expected.

According to embodiments, the telecommunication process monitoring server comprises a pre-defined schedule for the telecommunication process, the schedule comprises a set of intermediate results in form of a set of expected values of telecommunication progress indicators to be achieved by the calculated telecommunication process at pre-defined points in time This may have the beneficial effect that a set of time dependent criterions is provided in form of the set of expected values of the telecommunication progress indicators. By comparing the expected values with the values actually calculated, an intuitive insight may be provided into whether the telecommunication process proceeds and develops as expected or whether problems or potential problems may occur.

According to embodiments, the telecommunication status reports received and stored by the real-time database comprise notices of receipt for the sent messages from the second telecommunication devices.

This may have the beneficial effect that indicators may be defined and calculated which indicate whether or to which extent the sent messages have been received by the designated end devices.

According to embodiments, the telecommunication status reports received and stored by the real-time database comprise notices of transmission errors for the sent messages.

This may have the beneficial effect that the indicators may be defined and calculated such that they identify and indicate transmission problems for the messages.

According to embodiments, the telecommunication status reports received and stored by the real-time database comprise read confirmations for the sent messages from the second telecommunication devices.

This may have the beneficial effect that the indicators may be defined and calculated such that they indicate up to which extent the messages sent have been read by their receivers and to which extent they have probably been ignored, missed or filtered out.

According to embodiments, one or more of the sent messages comprises one or more links, the telecommunication status reports received and stored by the real-time database comprise notices about the number of accesses to the respective link.

This may have the beneficial effect that the indicators may be defined and calculated such that they indicate the success of the telecommunication process in view of the numbers of accesses to the respective link provided by a certain URL.

According to embodiments, the telecommunication status reports received and stored by the real-time database comprise reports about a receipt of messages received from the second telecommunication devices replying to the sent messages.

This may have the beneficial effect that the indicators may be defined and calculated such that they indicate the rate of reactions to the sent messages by replies received. The respective replies may be messages sent in response. The response messages may be of the same general type as the messages sent by the telecommunication process or of a different type. The sent messages may for example be an email and the received message may by a voice message.

According to embodiments, one or more of the sent messages comprise one or more requests for performing actions by the second telecommunication devices, the telecommunication status reports received and stored by the real-time database comprise confirmations of the performed actions.

This may have the beneficial effect that the indicators may be defined and calculated such that they indicate to which rate actions requested by the telecommunication process have actually be performed.

According to embodiments, the telecommunication status reports received and stored by the real-time database comprise status reports on means deployed for processing the telecommunication messages.

This may have the beneficial effect that problems with the progress of the telecommunication process due to problems with the infrastructure and/or devices used for processing the messages may be efficiently determined.

In another aspect, the invention relates to a computer program product for monitoring a telecommunication process on a digital telecommunication system. The computer program product comprises a computer readable storage medium having machine executable instructions embodied therewith. The machine executable instructions are executable by a processor controlling a telecommunication process monitoring server. The telecommunication process monitoring server is connectable with a handheld battery powered mobile end user telecommunication device via a mobile wireless cellular digital telecommunication network. The telecommunication process monitoring server further is connectable with a real-time database. The mobile end user telecommunication device comprises a processor, a display device and a memory. The mobile end user telecommunication device executes a mobile application. The mobile application comprises instructions stored in the memory that, when executed on the processor, cause the processor to display on the display device a graphical user interface configured for presenting one or more telecommunication progress indicators providing one or more performance measurements of the telecommunication process. The digital telecommunication system further comprises a telecommunication control server configured for controlling the telecommunication process on the digital telecommunication system. The digital telecommunication system further comprises a plurality of second telecommunication devices connectable with the telecommunication control server via one or more second digital telecommunication networks. The telecommunication process comprises sending one or more telecommunication messages to the plurality of second telecommunication devices. The real-time database is configured for receiving and storing a plurality of telecommunication status reports about the status of the processing of the one or more telecommunication messages by the telecommunication system. Execution of the machine readable instructions by the processor controlling the telecommunication process monitoring server causes the telecommunication process monitoring server executing a method comprising:

receiving by the telecommunication process monitoring server from the real-time database the one or more telecommunication progress indicators calculated by the real-time database, sending the one or more telecommunication progress indicators to be displayed by the graphical user interface on the display device from the telecommunication process monitoring server to the mobile end user telecommunication device.

Embodiments of the computer program product may be configured and comprise computer-executable instructions for performing each of the above described embodiments of the method.

In another aspect, the invention relates to a telecommunication process monitoring server for monitoring a telecommunication process on a digital telecommunication system. The telecommunication process monitoring server comprises a memory with machine executable instructions stored therein and a processor for executing the machine executable instructions. The telecommunication process monitoring server is connectable with a handheld battery powered mobile end user telecommunication device via a mobile wireless cellular digital telecommunication network. The telecommunication process monitoring server further is connectable with a real-time database. The mobile end user telecommunication device comprises a processor, a display device and a memory, wherein the mobile end user telecommunication device executes a mobile application. The mobile application comprises instructions stored in the memory that, when executed on the processor, cause the processor to display on the display device a graphical user interface configured for presenting one or more telecommunication progress indicators providing one or more performance measurements of the telecommunication process. The digital telecommunication system further comprises a telecommunication control server configured for controlling the telecommunication process on the digital telecommunication system. The digital telecommunication system further comprises a plurality of second telecommunication devices being connectable with the telecommunication control server via one or more second digital telecommunication networks. The telecommunication process comprises sending one or more telecommunication messages to the plurality of second telecommunication devices. The real-time database is configured for receiving and storing a plurality of telecommunication status reports about the status of the processing of the one or more telecommunication messages by the telecommunication system. Execution of the machine executable instructions by the processor of the telecommunication monitoring server causes the telecommunication monitoring server to execute a method comprising:

receiving by the telecommunication process monitoring server from the real-time database the one or more telecommunication progress indicators calculated by the real-time database, sending the one or more telecommunication progress indicators to be displayed by the graphical user interface on the display device from the telecommunication process monitoring server to the mobile end user telecommunication device.

Embodiments of the telecommunication process monitoring server may be configured and comprise computer-executable instructions for performing each of the above described embodiments of the method.

The telecommunication process monitoring server may be specially configured for the required purposes, or it may comprise a general term computer device configured for telecommunication which is selectively activated or reconfigured for the required purposes by a computer program stored in the computer device. Such a computer program may be stored in a computer readable storage medium, such as, but is not limited to, any type of disk including floppy disks, optical disks, CD-ROMs, and magnetic-optical disks, read-only memories (ROMs), random access memories (RAMs) such as dynamic RAM (DRAM), EPROMs, EEPROMs, magnetic or optical cards, or any type of media suitable for storing electronic instructions, and each coupled to a computer system bus.

In another aspect, the invention relates to a telecommunication system comprising a telecommunication process monitoring server as described above configured for monitoring a telecommunication process on the digital telecommunication system. The telecommunication process monitoring server being connectable with a handheld battery powered mobile end user telecommunication device via a mobile wireless cellular digital telecommunication network. The telecommunication process monitoring server further is connectable with a real-time database. The telecommunication process comprises sending one or more telecommunication messages to a plurality of second telecommunication devices. The telecommunication system further comprises: the mobile end user telecommunication device comprises a processor, a display device and a memory, wherein the mobile end user telecommunication device executes a mobile application; the mobile application comprises instructions stored in the memory that, when executed on the processor, cause the processor to display on the display device a graphical user interface configured for presenting one or more telecommunication progress indicators providing one or more performance measurements of the telecommunication process; a telecommunication control server configured for controlling the telecommunication process on the digital telecommunication system; a plurality of second telecommunication devices connectable with the telecommunication control server via one or more second digital telecommunication networks; the real-time database configured for receiving and storing a plurality of telecommunication status reports about the status of the processing of the one or more telecommunication messages by the telecommunication system.

Embodiments of the telecommunication system may be configured for performing each of the above described embodiments of the method.

It is understood that one or more of the aforementioned embodiments of the invention may be combined as long as the combined embodiments are not mutually exclusive.

BRIEF DESCRIPTION OF THE DRAWINGS

In the following, embodiments of the invention are explained in greater detail, by way of example only, making reference to the drawings in which.

DETAILED DESCRIPTION

In the following detailed description, reference is made to the accompanying drawings that form a part hereof, and in which is shown by way of illustration specific embodiments in which the inventive subject matter may be practiced. These embodiments are described in sufficient detail to enable those skilled in the art to practice them, and it is to be understood that other embodiments may be utilized and that structural, logical, and electrical changes may be made without departing from the scope of the inventive subject matter. Such embodiments of the inventive subject matter may be referred to, individually and/or collectively, herein by the term "invention" merely for convenience and without intending to voluntarily limit the scope of this application to any single invention or inventive concept if more than one is in fact disclosed.

The following description is, therefore, not to be taken in a limited sense, and the scope of the inventive subject matter is defined by the appended claims.

The functions or algorithms described herein are implemented in hardware, software or a combination of software and hardware in some embodiments. The software comprises computer executable instructions stored on computer readable media such as memory or other type of storage devices. Further, described functions may correspond to modules, which may be software, hardware, firmware, or any combination thereof. Multiple functions are performed in one or more modules as desired, and the embodiments described are merely examples. The software is executed on a digital signal processor, ASIC, microprocessor, or other type of processor operating on a system, such as a personal computer, server, a router, or other device capable of processing data including network interconnection devices.

Some embodiments implement the functions in two or more specific interconnected hardware modules or devices with related control and data signals communicated between and through the modules, or as portions of an application-specific integrated circuit. Thus, the exemplary process flow is applicable to software, firmware, and hardware implementations.

Figure 1:
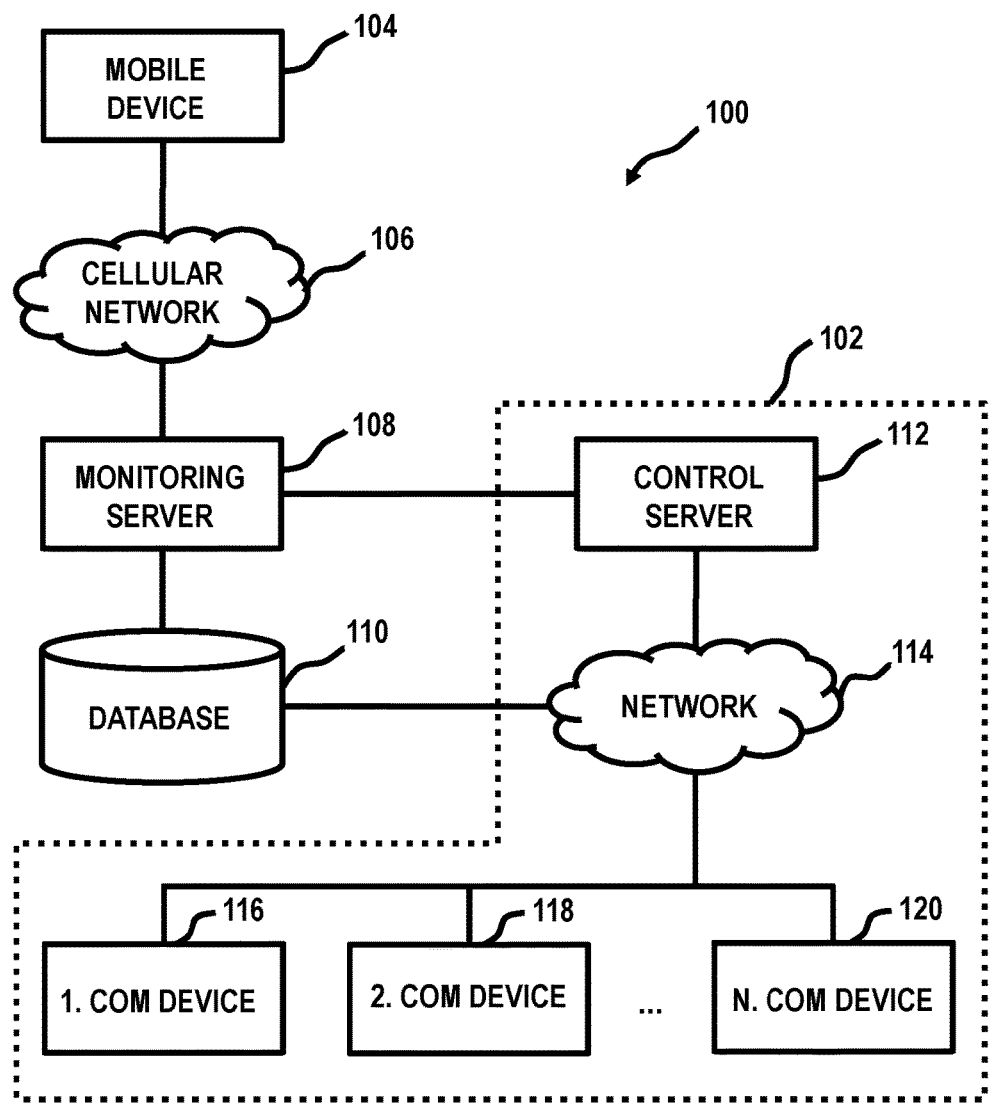
FIG. 1 depicts a schematic diagram illustrating an exemplary digital telecommunication system.

FIG. 1 shows a schematic diagram of a telecommunication system 100, according to an exemplary embodiment. The system 100 includes a monitoring server 108 monitoring telecommunication processes executed on the telecommunication system 100. The monitoring server 108 is connectable with a battery-powered mobile end user telecommunication device 104 via a cellular network 106. The monitoring server 108 is further connectable with a real-time database 110. According to embodiments, the real-time database 110 may be part of the monitoring server 108, it may be connected with the monitoring server directly per wire or wireless or it may be connected with the monitoring server 108 via a network. The real-time database 110 may for example be configured in form of an in-memory database.

The monitoring server 108 is further connectable with a control server 112 configured for controlling communication processes on the telecommunication system 100. The communication control server 112 may be part of the monitoring server 108, it may be connected with the monitoring server 108 per wire or wireless or it may be connected with the monitoring server 108 via a network. The control server 112 is part of a telecommunication sub-system 102 which is configured to distribute messages and receive status reports e.g. regarding the processing of the messages distributed. The telecommunication process executed using the telecommunication sub-system 102 is monitored by the monitoring server 108 via the data collected and stored in the real-time database 110. The telecommunication sub-system 102 may use and/or comprise a network 114. The control server 112 may be connectable with a plurality of second telecommunication devices 116, 118, 120 via the network 114. The control server 112 may generate and send a plurality of telecommunication messages via the network 114 to the second telecommunication devices 116, 118, 120. According to embodiments, the control server 112 may control a message server (not shown), like an email server, which generates and/or sends the messages. The control server 112 as well as the second telecommunication devices 116, 118, 120 may generate and send status reports regarding the status and/or progress of the telecommunication process to the real-time database 110 via the network 114. The received status reports may be stored without aggregation in the real-time database 110. The monitoring server 108 may monitor and/or initiate the start of the telecommunication process by the telecommunication control server 112. For example, upon request by the monitoring server 108, the real-time database 110 calculates one or more requested telecommunication progress indicators using the data provided by the status reports received from the telecommunication sub-system 102. The progress indicators are sent to the monitoring server 108 which transfers the received indicators to the end user mobile telecommunication device 104. The mobile telecommunication device 104 may display the received indicators on a display device comprised by the respective telecommunication device 104, e.g. integrated in a calendar event of a calendar application.

Figure 2:
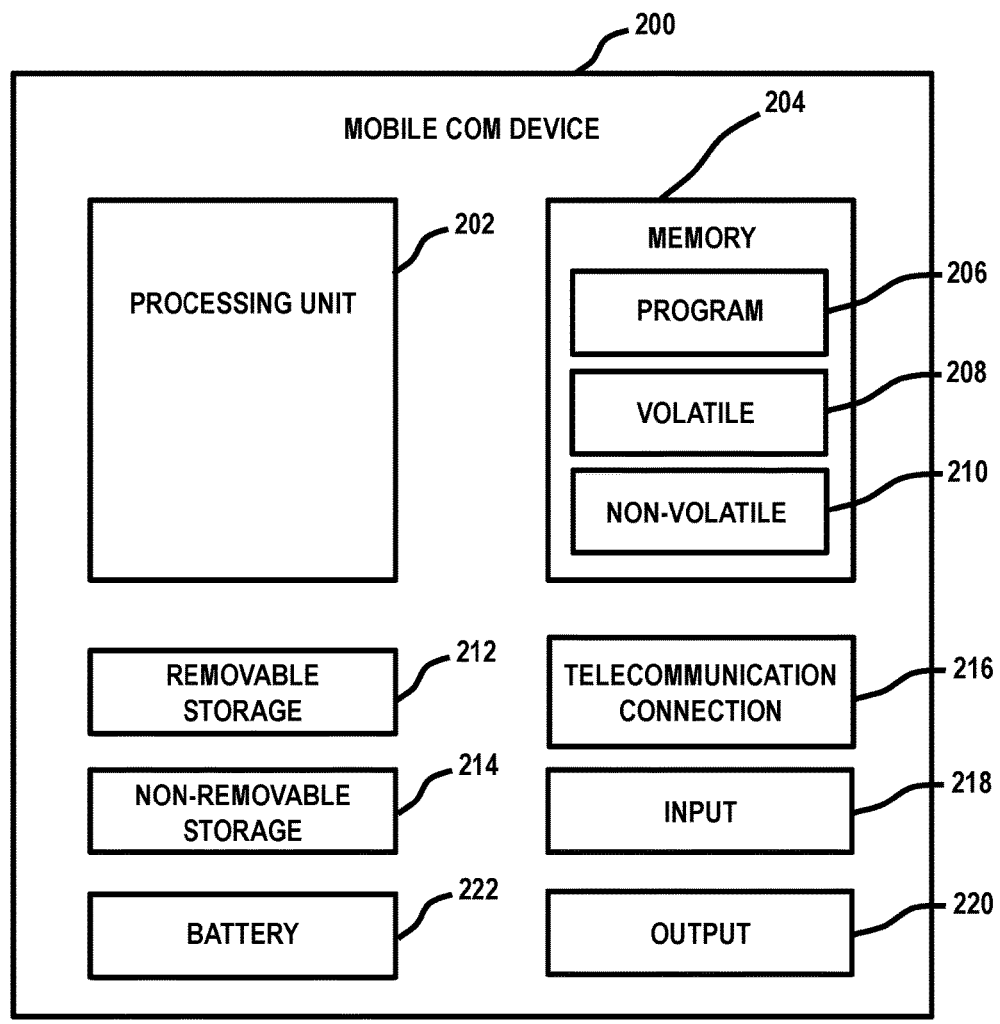
FIG. 2 depicts a schematic diagram illustrating an exemplary handheld battery-powered mobile end user telecommunication device.

FIG. 2 shows a schematic diagram illustrating an exemplary handheld battery-powered mobile end user telecommunication device 200. The communication device 200 may comprise a processing unit 202, also referred to as a processor. It may further comprise e.g. a memory 204, removable storage 212, and/or non-removable storage 214. The mobile telecommunication device 200 may for example be a smartphone, a tablet, a PDA, a smartwatch or the like. Although the various exemplary data storage elements are illustrated as part of the mobile telecommunication device 200, the storage elements may also or alternatively include cloud-based storage accessible via a network, such as the Internet.

The mobile telecommunication device 200 may include or have access to a computer environment that includes a variety of computer-readable media, such as e.g. volatile memory 208 and non-volatile memory 210, removable storage 212 and non-removable storage 214. The memory 204 may include volatile memory 208 and non-volatile memory 210. Computer storage comprised by or accessible for the mobile telecommunication device 200 may include random access memory (RAM), read-only memory (ROM), erasable programmable read-only memory (EPROM), electrically erasable programmable read only memory (EEPROM), flash memory or other memory technologies, compact disc read only memory (CDROM), digital versatile discs (DVD) or other optical disc storage, magnetic cassettes, magnetic tape, magnetic disc storage or other magnetic storage devices, or any other medium capable for storing computer-readable instructions. The mobile telecommunication device 200 may comprise or have access to a computer environment that includes an input module 218, an output module 220, and a telecommunication connection 216 for communicating via a mobile wireless cellular digital telecommunication network. The telecommunication connection 216 may further be configured to communicate via other types of digital telecommunication networks like Wi-Fi, Bluetooth and the like. The input module 218 may include one or more of a touchscreen, touchpad, keypad, camera, microphone and other input devices. The telecommunication device may operate in a networked environment using the telecommunication connection 216 to connect to one or more remote computer systems like a telecommunication process monitoring server, a database, and other computing devices. Exemplary remote computer systems may include personal computers, servers, router, networked PCs, a peer device or other common network node, or the like. The communication connection 216 may be a network interface device such as one or both of an Ethernet card and a wireless card or circuit that may be connected to a network. The network may for example include one or more of a local area network (LAN), a wide area network (WAN), the Internet and other networks. The network may for example include one of the following digital cellular technologies, including: Global System for Mobile Communications (GSM), General Packet Radio Service (GPRS), cdmaOne, CDMA2000, Evolution-Data Optimized (EV-DO), Enhanced Data Rates for GSM Evolution (EDGE), Universal Mobile Telecommunications System (UMTS), Digital Enhanced Cordless Telecommunications (DECT), Digital AMPS (IS-136/TDMA), or Integrated Digital Enhanced Network (iDEN).

The output module 220 may comprise a display device for displaying a graphical user interface, a loudspeaker, and the like.

Computer-readable instructions stored on a computer-readable medium are executable by the processing unit 202 of the mobile telecommunication device 200. For example, various computer programs or applications, such as one or more applications and modules implementing one or more of the methods illustrated and described herein or an application that is executed on the mobile device 200 or is accessible via a web browser, may be stored on a non-transitory computer-readable medium.

The mobile telecommunication device 200 may receive progress indicators providing one or more performance measurements from a telecommunication process monitoring server via telecommunication connection 216 and display the received data as part of a graphical user interface using the output 220.

Figure 3:
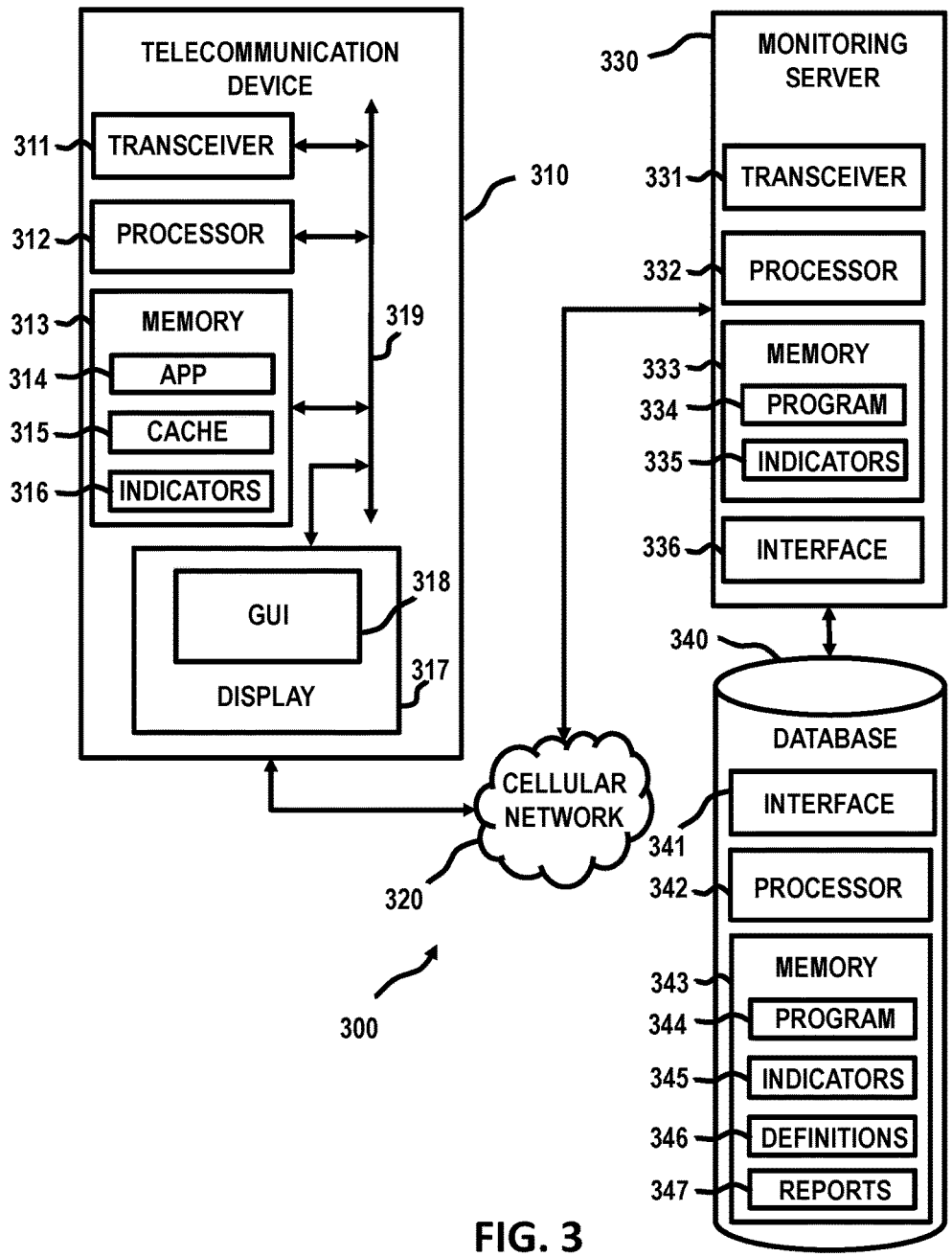
FIG. 3 depicts a second schematic diagram illustrating an exemplary telecommunication system.

FIG. 3 shows a schematic diagram illustrating an exemplary telecommunication system 300, such as e.g. comprised by the system 100 of FIG. 1, comprising an exemplary mobile telecommunication device 310, a monitoring server 330 and a database 340. The telecommunication device 310 may communicate with the monitoring server 330 via a cellular telecommunication network 320. The mobile telecommunication device 310 may comprise a transceiver 311, a processor 312, a memory 313, e.g. a main memory, each capable of communicating with one or more components of mobile telecommunication device 310. For example, all components are coupled to a bidirectional system bus 319. The mobile telecommunication device 310 may further comprise a cache 315. Although, the cache 315 is shown as a part of the memory 313, it may alternatively be separated from the memory 313 as a separate memory cache component, e.g. an SRAM component.

The processor 312 may be a microprocessor, a semi-processor, a multi-core processor or the like. The processor 312 may control the operation of the mobile telecommunication device 310. The transceiver 311 may be implemented as a transmitting component of the mobile telecommunication device 310. The mobile telecommunication device 310 may further comprise a display device 317 which displays characters and images and the like. The display device 317 may be configured to display a graphical user interface (GUI) 318. For example, the display device 317 may be a touch-sensitive display screen. The mobile telecommunication device 310 may receive telecommunication progress indicators 316 from the monitoring server 330 via the cellular network 320 and the transceiver 311. The indicator 316 may for example be stored in the memory 313. The memory 313 may further comprise an application 314 which is configured to generate a graphical user interface 318 to be displayed by the display device 317. The graphical user interface may comprise one or more graphical elements which include one or more of the indicators 316. For example, the application 314 may be a calendar application and the graphical user interface 318 may be a graphical user interface of the respective calendar application 314 which is configured to display graphical user interface elements in the form of calendar events that are assigned to telecommunication processes and in which the indicator 316 are included.

The mobile telecommunication device 310 may be connected via the cellular network 320 to the monitoring server 330. The monitoring server 330 may be a computer system comprising one or more computer devices. The telecommunication device 310 may use the transceiver 311 for exchanging data with the monitoring server 330 via the network 320, e.g. telecommunication progress indicators 316. The monitoring server 330 may comprise a transceiver 331 for communication with the telecommunication device 310, a processor 332 for controlling the monitoring server 330, a memory 333 comprising computer-executable program instructions 334 as well as telecommunication progress indicators 335 received from the database 340 to be transferred to the telecommunication device 310. The monitoring server 330 may further comprise a communication interface 336 for communicating with the database 340. The computer instructions 334, when being executed by the processor 332, may control the monitoring server 330 to request indicators 335 from the database 340 and transfer the received indicators to the telecommunication device 310. The monitoring server 333 may request the indicators 335 from the database 340 upon receiving a respective request from the telecommunication device 310.

The real-time database 340 may for example be an in-memory database comprising an interface 341 for communicating with the monitoring server 330. The real-time database 340 may be part of the monitoring server 330 or connected via a network, per wire or wireless. The real-time database 340 may further comprise a processor 342 and a memory 343 comprising computer-executable program instructions 344 to be executed by the processor 342. The memory may comprise a plurality of status reports 347 comprising e.g. information about the status and/or processing of one or more telecommunication messages sent via the telecommunication system. The database 340 may calculate the progress indicators 345 requested by the monitoring server 330 using definitions 346 for calculating the respective indicators 345 stored in the memory 343. The monitoring server 330 may request indicators 345 for example by referring to the definitions 346.

Figure 4:
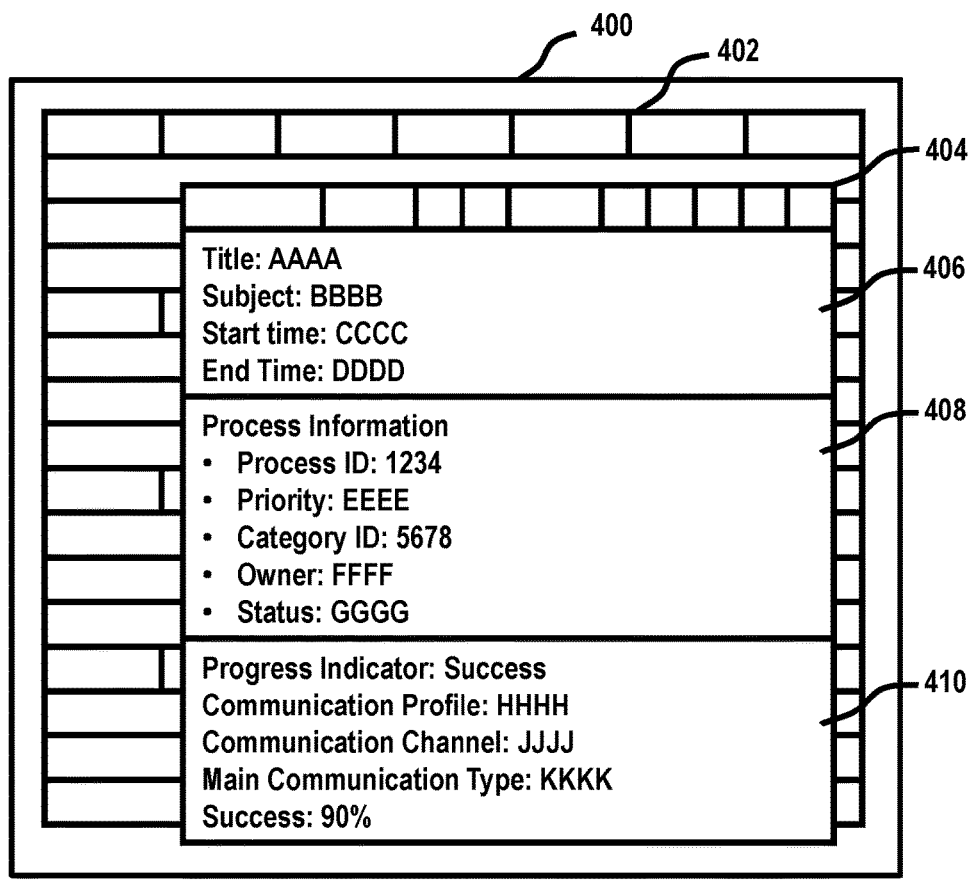
FIG. 4 depicts a schematic diagram illustrating an exemplary graphical user interface.

FIG. 4 shows a schematic diagram of an exemplary graphical user interface 400. The graphical user interface 400 may be a graphical user interface of a calendar application displaying a calendar 402 comprising a plurality of calendar events. Upon selection of one of the events, the respective calendar event may be displayed in form of a graphical user interface element 404. The event 404 may comprise event information 406 like a title identifying the calendar event, a subject identifying the subject of the calendar event like a certain telecommunication process, e.g. related to a marketing campaign. It may further comprise a starting time and an end time. Furthermore, the calendar event 404 may comprise process information 408 like a process ID, a priority assigned to the process, a category ID, information regarding the owner of the process and information regarding the status of the process. In addition, the calendar event may comprise a process indicator like e.g. level of success of the process, a communication profile of the communication infrastructure used for the process, a communication channel description of the communication channels used for the process, a main communication type information and a performance measurement provided by a progress indicator, like the current level of success. The level of success may for example be quantified by the ratio between the number of messages sent and the number of responses received, or the ratio between the number of messages sent and the number of downloads, the ratio between the number of messages sent and the number of links accessed, or the ratio between the number of messages sent and the number of orders placed. In addition, a warning may be displayed, in case that the current progress indicator does not match a pre-defined value.

Figure 5:
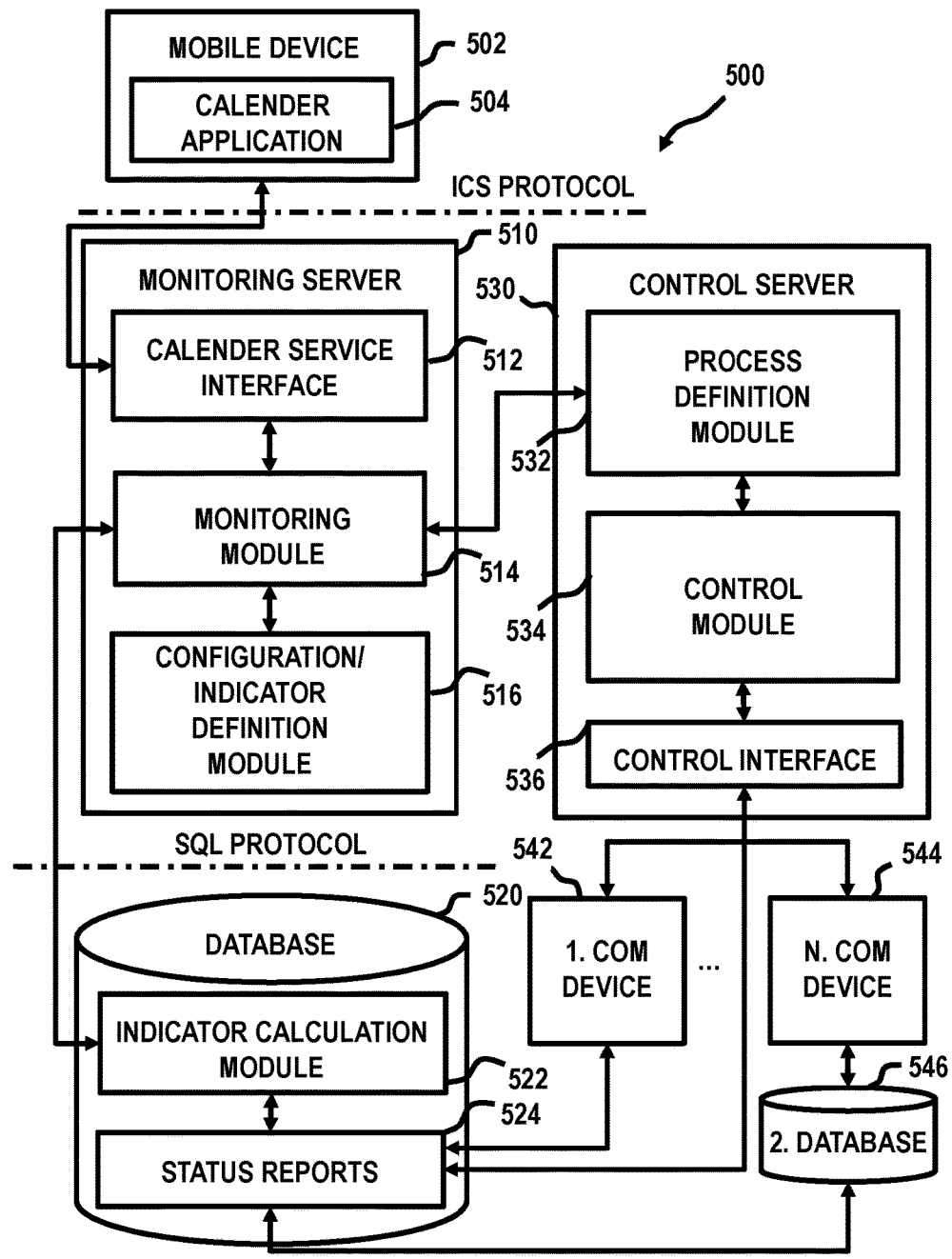
FIG. 5 depicts a schematic diagram illustrating an exemplary telecommunication.

FIG. 5 shows a schematic diagram illustrating an exemplary telecommunication system 500. The telecommunication system comprises a mobile telecommunication device 502 with a calendar application 504. The mobile telecommunication device is communicating with a monitoring server 510 using a communication protocol, for example according to the iCalendar format ICS. The calendar application 504 of the mobile telecommunication device 502 may communicate with the monitoring server 510 via the calendar service interface 512. The calendar service interface 512 communicates with a monitoring module 514. The monitoring module 514 may communicate with a process definition module 532 of a control server 530. Furthermore, the monitoring module 514 may communicate with an indicator calculation module 522 of a real-time database 520. The monitoring module 514 may additionally communicate with a monitoring configuration and indicator definition module 516. The monitoring configuration module 516 may comprise configuration files for the graphical user interface and graphical user interface elements to be displayed by the calendar application 504. Furthermore, the monitoring configuration module 516 may provide configuration files for the telecommunication process controlled by the control server 530. The module 516 may additionally comprise definitions of the indicators which are provided to the database 520 and used by the same for calculating indicators with the indicator calculation module 522.

The control server 530 may comprise a process definition module 532 comprising the definition of the telecommunication process to be controlled by the control server 530. The respective definitions comprised by the process definition module 532 may be received from the monitoring configuration and indicator definition module 516 of the monitoring server 510. The control module 534 controls the telecommunication process. The telecommunication process may be executed by the control server 530 using additional computer devices (not shown) for generating and sending messages to a plurality of communication devices 542, 544. Alternatively, the control server 530 may be configured to generate and send the messages to the plurality of communication devices 542, 544. The control server 530 may control the distribution of the messages to the communication devices 542, 544 via the communication control interface 536.

The real-time database 520 may receive status reports 524 about the status and/or progress of the telecommunication process from the telecommunication devices 542, 544. Furthermore, the real-time database 520 may receive status reports from the control server 530. The real-time database 520 may also comprise status reports which are mirrored from a second database 546 which receives the respective status reports e.g. from telecommunication devices 544.

Figure 6:
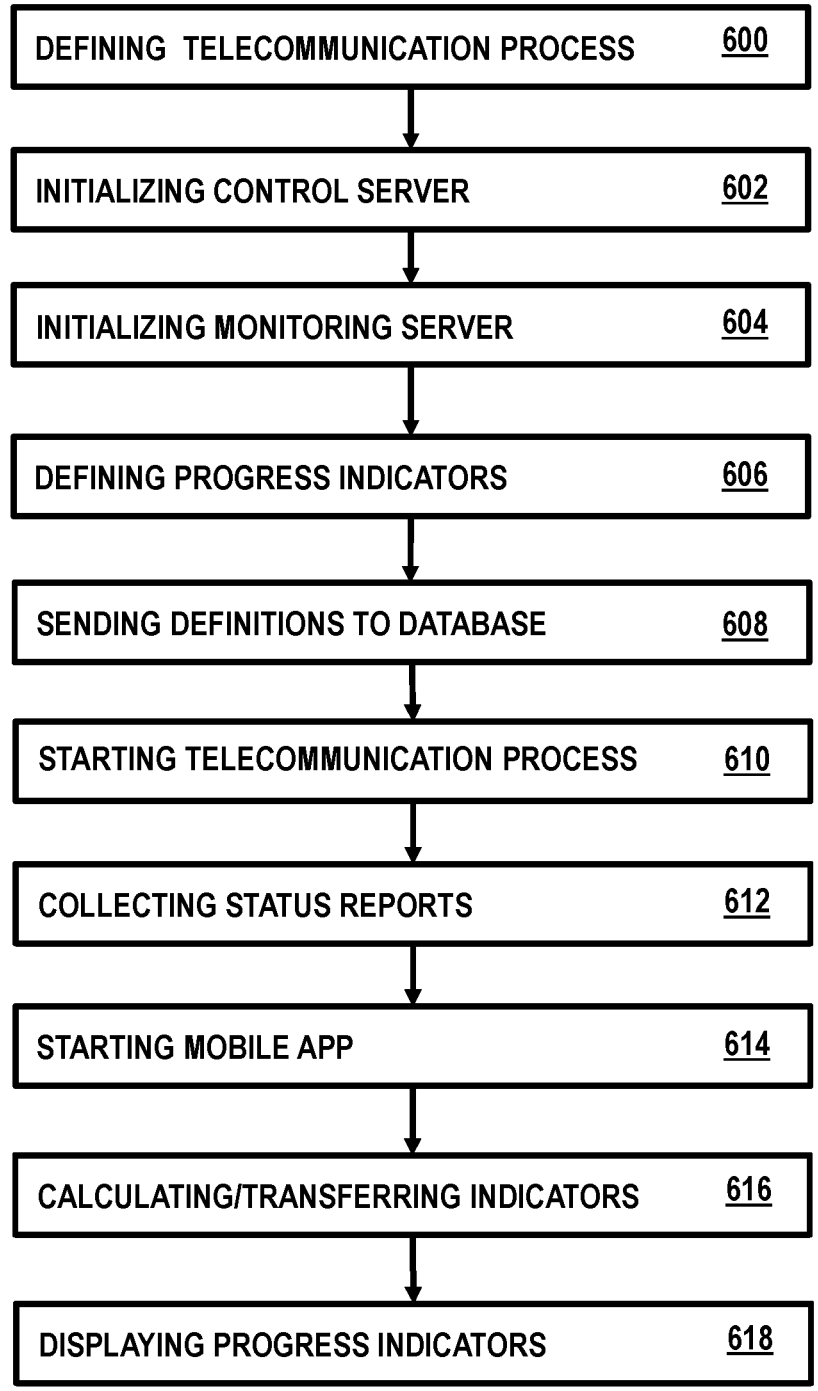
FIG. 6 depicts a first schematic flow diagram of a method of monitoring a telecommunication process.

FIG. 6 shows a first schematic flow diagram of a method for monitoring a telecommunication process. In block 600, the telecommunication process is defined. The definition of the telecommunication process may be provided by the control server, the monitoring server or a third server. In block 602, the control server is initialized, i.e. provided with the definitions of the respective telecommunication process. In block 604, the monitoring server is initialized by being provided with monitoring configurations. In block 606, the progress indicators are defined on the monitoring server. In block 608, the definitions of the indicators generated by the monitoring server are sent to the database. In block 610, the telecommunication process is started, e.g. by a respective start signal being sent by the monitoring server to the control server. Alternatively, the control server starts the telecommunication process and informs the monitoring server about the start of the process. In block 612, status reports resulting from the telecommunication process are received by the real-time database and the data comprised therein is stored. In block 614, the mobile application may be started. In block 616, progress indicators may be calculated by the real-time database, e.g. upon receipt of a respective request sent by the mobile end user telecommunication device upon start of the mobile application, and transferred via the monitoring server to the mobile end user telecommunication device. In block 618, the received indicators are displayed by the mobile telecommunication device. The calculation of the indicators in block 616 may be initialized by a respective request from the mobile end user telecommunication device sent to the real-time database via the monitoring server, a pre-defined schedule or upon determining an amendment of an entry of the real-time database.

Figure 7:
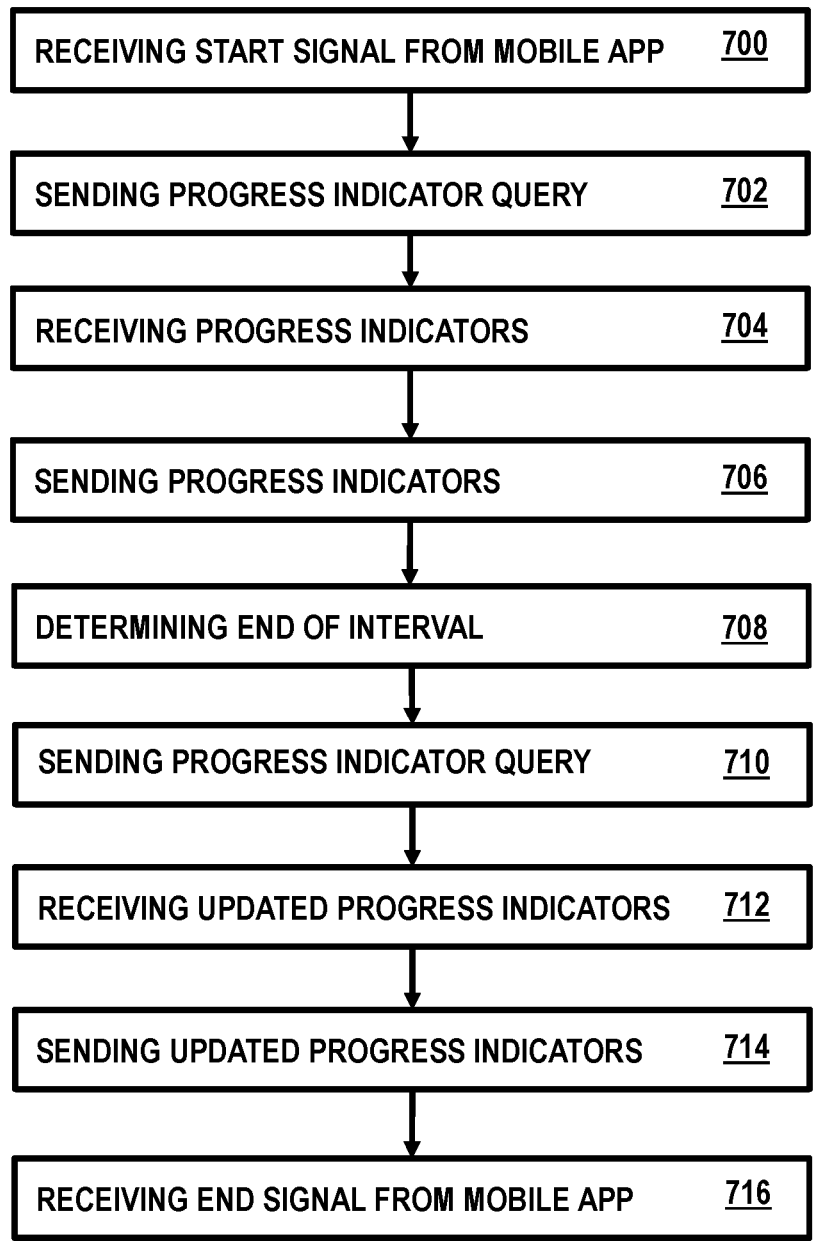
FIG. 7 depicts a second schematic flow diagram illustrating an exemplary method for monitoring a telecommunication process.

FIG. 7 shows a schematic block diagram of a method for monitoring a telecommunication process. In block 700, the monitoring server receives a start signal from the mobile application on the mobile telecommunication device. Upon receiving the signal, the monitoring server sends a progress indicator query in block 702 to the real-time database. The real-time database calculates the requested indicators using the data of the status report stored in the same. The monitoring server receives the calculated progress indicators from the real-time database in block 704. In block 706, the monitoring server sends the received progress indicators to the end user telecommunication device. In block 708, the monitoring server determines that a pre-defined interval of time has ended and in response to the ending of the pre-defined interval of time in block 708, the monitoring server again sends the progress indicator query to the database in block 710. Upon sending the query in block 710, the monitoring server receives progress indicators which have been recalculated using the current status reports stored in the real-time database in block 712. In block 714, the updated progress indicators are sent to the end user telecommunication device. In block 716, the monitoring server may receive an end signal from the mobile application that the application has been stopped on the telecommunication device.

Figure 8:
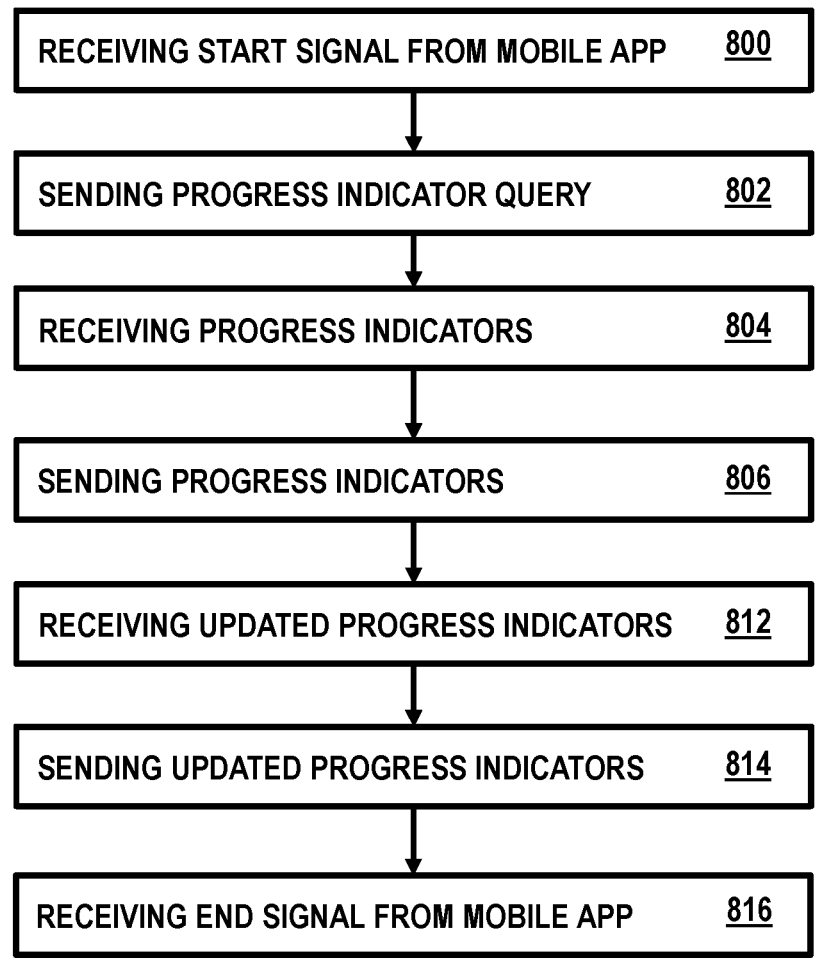
FIG. 8 depicts a third schematic flow diagram illustrating an exemplary method for monitoring a telecommunication process.

FIG. 8 shows a third exemplary flow diagram of a method for monitoring a telecommunication process. According to FIG. 8 push messages are sent by the real-time database to the monitoring server with updated progress indicators upon detecting an amendment of one or more pre-defined entries of the real-time database. In block 800, the monitoring server receives a start signal from the mobile application of the mobile end user telecommunication device indicating that the respective application has been started. In block 802, a progress indicator query is sent to the real-time database in response to receiving the start signal in block 800. In block 804, the requested progress indicators are received from the database. In block 806, the received progress indicators are sent to the mobile end user telecommunication device in order to be displayed in form of or as part of a graphical user interface element on the display of the respective mobile end user telecommunication device. In block 812, the monitoring server receives updated progress indicators. The updated progress indicators are calculated by the database upon determining that a predefined entry used for the calculation of the respective indicators has been amended. Upon this detection the progress indicator may be calculated and sent to the monitoring server in form of a push message. The received updated progress indicators are sent to the mobile end user device in block 814. In block 816, the method may end by receiving a signal from the mobile application which indicates that the respective application has been ended.

Figure 9:
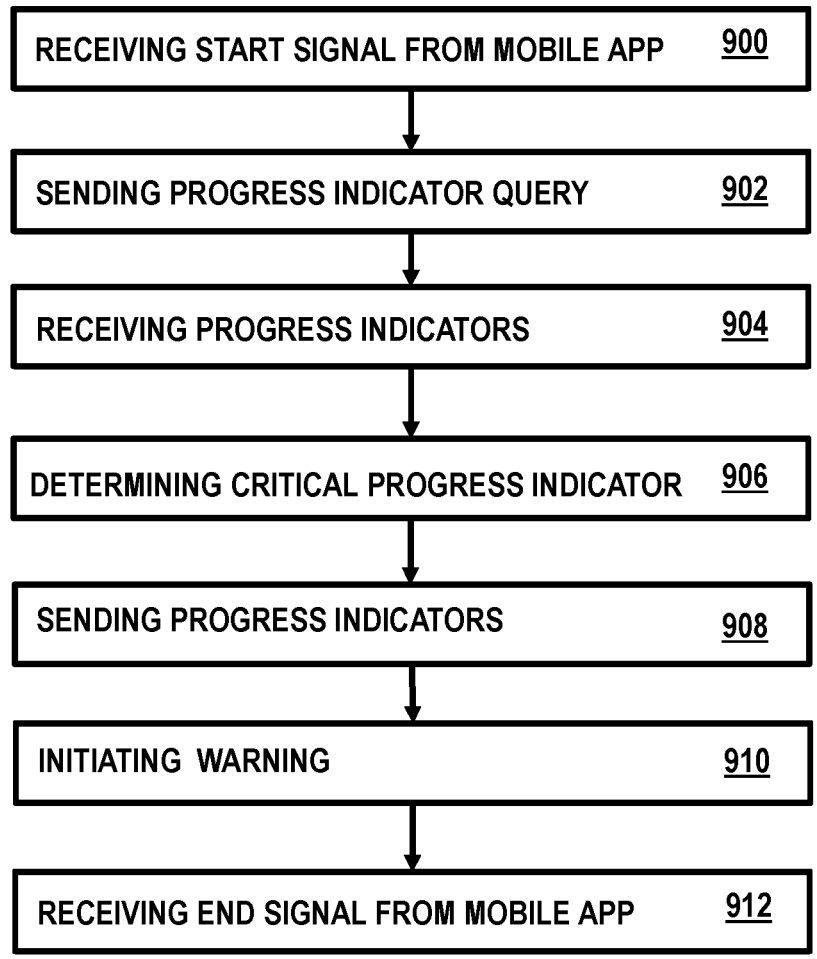
FIG. 9 depicts a fourth schematic flow diagram illustrating a method for monitoring a telecommunication process.

FIG. 9 shows a fourth schematic flow diagram of a method for monitoring a telecommunication process. The method starts in block 900 by receiving a start signal from the mobile application executed on the mobile telecommunication device. In block 902, a progress indicator query is sent to the database by the control server upon receiving the start signal from the mobile application in block 900. In block 904, the requested progress indicators are received from the real-time database by the monitoring server. In block 906, a critical progress indicator may be identified by the monitoring server. The critical progress indicator may be identified by determining that the respective indicator exceeds a pre-defined threshold value or is identical to a pre-defined status value. In block 908, the progress indicators are sent to the end user device. In block 910, a warning is initiated by the monitoring server to be displayed by the end user telecommunication device. For example, a warning indicator may be assigned to the critical progress indicator and sent with the same to the mobile end user telecommunication device. The mobile end user telecommunication device displays the indicators in form of graphical user interface elements on its display device. For the critical progress indicator, the graphical user interface may comprise a warning additionally displayed thereon, e.g. using a color code like a red background for the critical progress indicator. In block 912, the method ends with receiving an end signal from the mobile application indicating that the respective application ended.

LIST OF REFERENCE SIGNS 100 telecommunication system
102 telecommunication sub-system
104 mobile telecommunication device
106 cellular telecommunication network
108 monitoring server
110 real-time database
112 control server
114 digital telecommunication network
116 second telecommunication device
118 second telecommunication device
120 second telecommunication device
200 mobile telecommunication device
202 processing unit
204 memory
206 program instructions
208 volatile memory
210 non-volatile memory
212 removable storage
214 non-removable storage
216 telecommunication connection
218 input device
220 output device
222 battery 300 telecommunication system
310 telecommunication device
311 transceiver
312 processor
313 memory
314 application
315 cache
316 progress indicators
317 display
318 GUI
319 bus
320 cellular telecommunication network
330 monitoring server
331 transceiver
332 processor
333 memory
334 program instructions
335 progress indicators
336 interface
340 real-time database
341 interface
342 processor
343 memory
344 program instructions
345 progress indicators
346 definitions of progress indicators
347 status reports
400 GUI
402 calendar
404 calendar event
406 event information
408 process information
410 progress indicator
500 telecommunication system
502 mobile telecommunication device
504 calendar application
510 monitoring server
512 calendar service interface
514 monitoring module
516 monitoring configuration/progress indicator definition
520 real-time database
522 progress indicator calculation module
524 status reports
530 control server
532 telecommunication process definition
534 control module
536 control interface
542 second telecommunication device
544 second telecommunication device
546 second database

The invention claimed is:

1. A method for monitoring, with a mobile end user telecommunication device, a telecommunication process on a digital telecommunication system using a telecommunication process monitoring server, the telecommunication process monitoring server being connectable with the mobile end user telecommunication device, the telecommunication process monitoring server further being connectable with a real-time database, the digital telecommunication system comprising a telecommunication control server configured for controlling the telecommunication process on the digital telecommunication system, the digital telecommunication system further comprising a plurality of second telecommunication devices being connectable with the telecommunication control server, the method comprising:

modifying, by the telecommunication process monitoring server, a definition of one or more telecommunication progress indicators without modifying any structure of the real-time database, the one or more telecommunication progress indicators relating to the telecommunication process, the one or more telecommunication progress indicators providing one or more performance measurements and being calculated by the real-time database based on the modified definition;

receiving, by the telecommunication process monitoring server from the real-time database, the one or more telecommunication progress indicators; and sending, by the telecommunication process monitoring server, the one or more telecommunication progress indicators to the mobile end user telecommunication device, the one or more telecommunication progress indicators being sent in a form displayable by a graphical user interface as part of a calendar application without further calculation by the mobile end user telecommunication device on the one or more telecommunication progress indicators beyond updating, integrating and displaying the one or more telecommunication progress indicators in the calendar application.

2. The method of claim 1, wherein the receipt of the one or more telecommunication progress indicators by the telecommunication process monitoring server is initiated by the telecommunication process monitoring server querying the real-time database for the respective one or more telecommunication progress indicators.

3. The method of claim 2, wherein the query of the real-time database for the one or more telecommunication progress indicators is initiated by the telecommunication process monitoring server in response to receiving a request for the one or more telecommunication progress indicators from the mobile end user telecommunication device.

4. The method of claim 3, wherein the request for the one or more telecommunication progress indicators is received from the mobile end user telecommunication device in response to starting the calendar application.

5. The method of claim 3, wherein the request for the one or more telecommunication progress indicators is received from the mobile end user telecommunication device automatically in pre-defined intervals of time.

6. The method of claim 1, wherein the receipt of the one or more telecommunication progress indicators by the telecommunication process monitoring server is initiated by the real-time database calculating and sending the respective one or more telecommunication progress indicators to the telecommunication process monitoring server upon detecting an amendment of a pre-defined entry of the real-time database.

7. The method of claim 1, the method further comprising:

monitoring, by the telecommunication process monitoring server, a set of telecommunication processes executed on the digital telecommunication system, the telecommunication process being one of the set of telecommunication processes executed on the digital telecommunication system, each telecommunication process being monitored by the telecommunication process monitoring server, the one or more telecommunication progress indicators being telecommunication progress indicators of a set of telecommunication progress indicators, wherein, for each telecommunication process of the set of telecommunication processes, one or more telecommunication progress indicators are received by the telecommunication process monitoring server and sent to the mobile end user telecommunication device.

8. The method of claim 7, the method further comprising:
receiving a request for a list of telecommunication processes with telecommunication progress indicators satisfying a pre-defined criterion;
querying the real-time database for telecommunication processes with telecommunication progress indicators satisfying the pre-defined criterion;
receiving the respective list of telecommunication processes in response to the querying; and
sending the received list to the mobile end user telecommunication device in order to indicate the telecommunication processes comprised by the received list.

9. The method of claim 1, the method further comprising:
sending the modified definition from the telecommunication process monitoring server to the real-time database, the modified definition defining at least one of the one or more telecommunication progress indicators and its calculation methods.

10. The method of claim 1, the method further comprising:
storing, by the real-time database, a plurality of telecommunication status reports; and
calculating, by the real-time database, the one or more telecommunication progress indicators by processing the plurality of telecommunication status reports only upon satisfaction of a condition.

11. The method of claim 1, the method further comprising:
storing, in the real-time database, one or more data files mirroring one or more data files of one or more second databases.

12. The method of claim 1, wherein the sending of the one or more telecommunication progress indicators further comprises sending a command for displaying a warning for one or more of the telecommunication progress indicators satisfying a predefined criterion.

13. The method of claim 12, wherein the predefined criterion is an exceeding of a predefined threshold value.

14. The method of claim 12, the method further comprising:
executing, by the telecommunication process monitoring server, a predefined schedule for the telecommunication process, the schedule comprising a set of intermediate results in form of a set of expected telecommunication progress indicators to be achieved by the telecommunication process at predefined points in time, a set of time dependent criterions being provided in form of the set of expected telecommunication progress indicators.

15. The method of claim 1, the method further comprising:
receiving and storing, by the real-time database, telecommunication status reports indicating a receipt of messages from the plurality of second telecommunication devices replying to telecommunication messages.

16. The method of claim 15, wherein the telecommunication messages comprise one or more requests for performing actions by the plurality of second telecommunication devices, and the telecommunication status reports comprise confirmations of the performed actions.

17. The method of claim 1, the method further comprising:

displaying, via the calendar application, the one or more telecommunication progress indicators as part of a calendar event representing the telecommunication process.

18. A non-transitory computer readable medium including machine executable instructions, which when executed by a telecommunication process monitoring server cause the telecommunication process monitoring server to perform a method for monitoring a telecommunication process on a digital telecommunication system including the telecommunication process monitoring server, the telecommunication process monitoring server being connectable with a mobile end user telecommunication device via a mobile wireless cellular digital telecommunication network, the telecommunication process monitoring server further being connectable with a real-time database, the digital telecommunication system further comprising a telecommunication control server configured for controlling the telecommunication process on the digital telecommunication system, the digital telecommunication system further comprising a plurality of second telecommunication devices being connectable with the telecommunication control server, execution of the machine readable instructions causing the telecommunication process monitoring server to:
modify a definition of one or more telecommunication progress indicators without modifying any structure of the real-time database, the one or more telecommunication progress indicators relating to the telecommunication process, the one or more telecommunication progress indicators providing one or more performance measurements and being calculated by the real-time database based on the modified definition;
receive, from the real-time database, the one or more telecommunication progress indicators; and
send the one or more telecommunication progress indicators to the mobile end user telecommunication device, the one or more telecommunication progress indicators being sent in a form displayable by a graphical user interface as part of a calendar application without further calculation by the mobile end user telecommunication device on the one or more telecommunication progress indicators beyond updating, integrating and displaying the one or more telecommunication progress indicators in the calendar application.

19. A telecommunication process monitoring server for monitoring a telecommunication process on a digital telecommunication system, the telecommunication process monitoring server being connectable with a mobile end user telecommunication device, the telecommunication process monitoring server further being connectable with a real-time database, the digital telecommunication system further comprising a telecommunication control server configured for controlling the telecommunication process on the digital telecommunication system, the digital telecommunication system further comprising a plurality of second telecommunication devices being connectable with the telecommunication control server, the telecommunication process monitoring server being configured to:
modify a definition of one or more telecommunication progress indicators without modifying any structure of the real-time database, the one or more telecommunication progress indicators relating to the telecommunication process, the one or more telecommunication progress indicators providing one or more performance measurements and being calculated by the real-time database based on the modified definition;

receive, from the real-time database, the one or more telecommunication progress indicators; and send the one or more telecommunication progress indicators to the mobile end user telecommunication device, the one or more telecommunication progress indicators being sent in a form displayable by a graphical user interface as part of a calendar application without further calculation by the mobile end user telecommunication device on the one or more telecommunication progress indicators beyond updating, integrating and displaying the one or more telecommunication progress indicators in the calendar application.

20. A digital telecommunication system comprising:

the telecommunication process monitoring server of claim 19;

the telecommunication control server;

the mobile end user telecommunication device;

the real-time database; and a plurality of second telecommunication devices connectable with the telecommunication control server via one or more digital telecommunication networks, wherein the telecommunication control server is further configured to control the telecommunication process on the digital telecommunication system, and wherein the real-time database is configured to receive and store a plurality of telecommunication status reports about the status of the processing of one or more telecommunication messages by the digital telecommunication system.

\* \* \* \* \*